US007269501B2

(12) United States Patent
Melzig et al.

(10) Patent No.: US 7,269,501 B2
(45) Date of Patent: Sep. 11, 2007

(54) METHOD AND DEVICE FOR MONITORING THE FUNCTIONING OF A VALVE STROKE ADJUSTING DEVICE OF AN INTERNAL COMBUSTION ENGINE DURING COLD STARTS

(75) Inventors: Thomas Melzig, Leonberg-Hoefingen (DE); Nils Nagel, Leonberg (DE)

(73) Assignee: Dr. Ing. h.c.F. Porsche Aktiengesellscaft, Stuttgart (DE)

( * ) Notice: Subject to any disclaimer, the term of this patent is extended or adjusted under 35 U.S.C. 154(b) by 0 days.

(21) Appl. No.: 11/447,936

(22) Filed: Jun. 7, 2006

(65) Prior Publication Data

US 2006/0283422 A1 Dec. 21, 2006

(30) Foreign Application Priority Data

Jun. 7, 2005 (DE) .................... 10 2005 026 054

(51) Int. Cl.
*F02D 11/10* (2006.01)

(52) U.S. Cl. .................... 701/114; 123/396; 123/399; 73/117.3

(58) Field of Classification Search ................ 701/109, 701/111, 113, 114; 123/396, 399, 90.15, 123/90.16; 60/274, 276, 277, 281, 285, 286; 702/22, 108, 113, 114, 115; 73/116, 119 R, 73/117.3, 118.1
See application file for complete search history.

(56) References Cited

U.S. PATENT DOCUMENTS

| 6,213,068 | B1 | 4/2001 | Hassdenteufel |
| 6,338,321 | B1 * | 1/2002 | Denz .................... 123/90.15 |
| 6,581,557 | B1 | 6/2003 | Gaessler et al. |
| 6,588,257 | B1 | 7/2003 | Wild et al. |
| 6,637,386 | B2 * | 10/2003 | Murata et al. ........... 123/90.15 |
| 6,817,173 | B2 * | 11/2004 | Paffrath et al. ............... 60/293 |
| 6,948,358 | B2 | 9/2005 | Weiss et al. |
| 2002/0062799 | A1 | 5/2002 | Murata et al. |
| 2005/0044934 | A1 | 3/2005 | Weiss et al. |

FOREIGN PATENT DOCUMENTS

| DE | 198 57 183 A1 | 6/2000 |
| DE | 199 47 098 | * 11/2000 |
| DE | 199 54 535 A1 | 6/2001 |
| DE | 199 63 753 A1 | 7/2001 |
| DE | 100 16 103 A1 | 10/2001 |
| DE | 101 56 140 A1 | 8/2002 |

(Continued)

OTHER PUBLICATIONS

European Search Report dated Sep. 19, 2006.

*Primary Examiner*—Willis R. Wolfe
*Assistant Examiner*—Johnny H. Hoang
(74) *Attorney, Agent, or Firm*—Crowell & Moring LLP (57) ABSTRACT

A method and device for monitoring the functionality of a valve stroke adjusting device of an internal combustion engine in a cold start phase. The internal combustion engine includes an electronically controllable throttle, the control utilizing an integral component to control the throttle, and the functionality is monitored by determining the integral component in a cold start phase, comparing the integral component with at least one predetermined threshold value and evaluating the functionality of the valve stroke adjusting device on the basis of the comparison.

14 Claims, 5 Drawing Sheets

FOREIGN PATENT DOCUMENTS

| | | |
|---|---|---|
| DE | 102 30 899 A1 | 2/2004 |
| EP | 1 020 623 A2 | 7/2000 |
| EP | 1 460 254 A1 | 9/2004 |
| EP | 1 467 068 A1 | 10/2004 |
| JP | 6 129403 A | 5/1994 |

* cited by examiner

METHOD AND DEVICE FOR MONITORING THE FUNCTIONING OF A VALVE STROKE ADJUSTING DEVICE OF AN INTERNAL COMBUSTION ENGINE DURING COLD STARTS

This application claims the priority of German application no. 102005026054.3-26, filed Jun. 7, 2005, the disclosures of which is expressly incorporated by reference herein.

BACKGROUND AND SUMMARY OF THE INVENTION

The present invention relates to a method and a device for monitoring the function of a valve stroke adjusting device of an internal combustion engine during cold starts.

Modern internal combustion engines are equipped with serial camshaft adjusting systems for improving power and torque. All such systems function according to the principle of rotation of the phasing of the camshaft relative to the crankshaft by means of hydraulic or hydromechanical adjustment elements.

However, such systems are scarcely able to meet rising demands on exhaust quality, fuel efficiency, power and torque. There are already developments on the market such as the multistep or stepless valve stroke adjusting system.

German patent publication DE 100 16 103 A1 describes a valve stroke adjusting device. The valve stroke is adjusted so that the valve blocks the gas flow of the air/fuel mixture to a greater or lesser degree, which decisively influences how the combustion chambers are filled with and emptied of the combustion gas.

Besides the pure adjusting function, importance is also placed on aspects such as a simple, robust construction, small friction losses, reliable function over the entire useful life, applicability to existing cylinder head constructions, and so on. It should be possible to use the device in both Otto and diesel engines on the intake and/or exhaust sides.

The proper functioning of a valve stroke adjusting device is an important factor in reducing the fuel consumption and exhaust emission of an internal combustion engine. Therefore the legislature has mandated that whenever an internal combustion engine is equipped with a valve stroke adjustment system, the functionality of such system must be monitored.

One type of valve stroke adjusting system, for example, switches from a small valve stroke to a large stroke immediately upon the ignition of the engine during a prescribed cold start phase. Known monitoring systems have problems during this cold start phase or have complicated and expensive constructions.

European patent publication EP 1 467 068 A1 describes a method in which the valve stroke adjustment is evaluated by a lambda probe with reference to the exhaust gas composition. This known system has exhibited the drawback that the lambda probes are not operational during cold starts.

Another possibility for monitoring functionality is to detect uneven running in individual cylinders and compare it with predetermined threshold values. However, there is no notable unevenness during cold starts.

Still another possibility for monitoring functionality is to evaluate the signal of the airflow meter. The drawback of this method is that the signal qualities of the airflow meter are heavily dependent on other factors.

A solution which involves a large expenditure for sensor technology is to measure the pressures in front of the intake valves. Different pressure levels can be correlated with different valve stroke profiles. These pressure levels are compared with values stored in engine operating maps.

Japanese patent publication JP 61 294 03 discloses a valve stroke monitoring device having a solenoid valve for opening and closing an air intake line in an operation section. The solenoid valve is closed for a definite time-span by means of a diagnostic start signal, and when the valve opens, an abnormality signal is emitted if a valve opening value is below a predetermined threshold value. A stroke detector measures the valve's opening level. It is also expensive to apply this known solution to monitoring the functionality of a valve stroke adjusting device.

An object of the present invention is to provide an improved method and a relatively inexpensive device for monitoring the functionality of a valve stroke adjusting device of an internal combustion engine during cold starts, which device is optimally reliable.

The method of the invention claimed and the corresponding device for monitoring the functionality of a valve stroke adjusting device of an internal combustion engine during cold starts exhibit the advantage that monitoring can be carried out inexpensively and precisely.

The central idea of the invention is that the monitoring of the functionality of a valve stroke adjusting device of an internal combustion engine during cold starts is based on the integral component of the throttle control. The advantages of this type of monitoring are that it does not require any extra expenditure for sensors, and monitoring can be carried out a few seconds after the start-up of the engine.

According to a preferred embodiment, there is a measuring step to determine the time elapsed since the start of the cold start phase and whether said time-span is at least equal to a predetermined time-span, which condition must be fulfilled before the acquisition of the integral component in the cold start phase will be performed. The advantage of this is that it prevents faulty detection at the beginning of the cold start phase.

According to a further preferred development, the threshold value to be compared with the acquired integral component is chosen from a number of predetermined threshold values on the basis of the measured time-span. This way, a time dependency of the integral components is taken into account.

According to a further preferred embodiment, the internal combustion engine comprises two cylinder banks with separate valve stroke adjustment by the valve stroke adjusting device, and the comparison and evaluation steps proceed as follows: a first comparison of the integral component acquired in the cold start phase with a predetermined first threshold value; first evaluation of the functionality of the valve stroke adjusting device of both cylinder banks based on the result of the first comparison; if the first evaluation indicates that the functionality of the valve stroke adjusting device of at least one of the two cylinder banks is faulty, a second comparison of the integral component acquired in the cold start phase with a predetermined second threshold value; a second evaluation of the functionality of the valve stroke adjusting device of the two cylinder banks based on the second result of the second comparison. This allows for incremental diagnosis.

According to a further preferred embodiment, the threshold value or values are stored in a storage device.

According to a further preferred embodiment, the threshold value or values are adapted before the comparison on the basis of a throttle setpoint value adaptation. This way, aging processes and error tolerances can be taken into account.

According to a further preferred embodiment, errors detected in the functioning of the valve stroke adjusting device are indicated by a signaling means. This way, the driver can be informed of errors.

Other objects, advantages and novel features of the present invention will become apparent from the following detailed description of the invention when considered in conjunction with the accompanying drawings.

Identical or functionally equivalent elements are assigned the same reference signs.

DETAILED DESCRIPTION OF THE DRAWINGS

Figure 1:
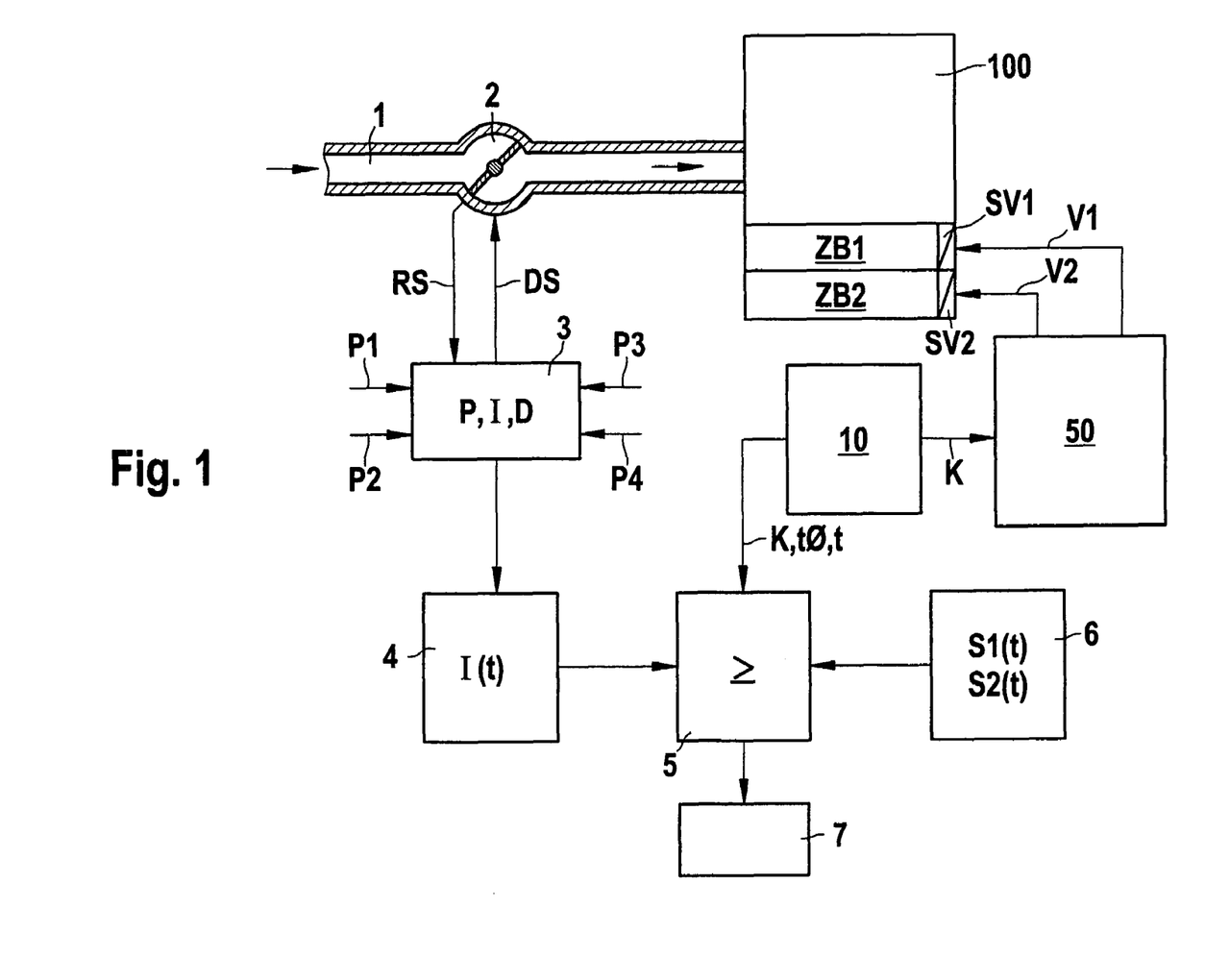
FIG. 1 is a block diagram of a first embodiment of the inventive device for monitoring the functionality of a valve stroke adjusting device of an internal combustion engine.

FIG. 1 is a block diagram representing a first embodiment of the device of the invention for monitoring the functionality of a valve stroke adjusting device of an internal combustion engine.

The number 1 in FIG. 1 designates a suction line of an internal combustion engine 100 having two cylinder banks ZB1, ZB2. A valve stroke adjusting device 10, 50, SV1, SV2 comprises a control device 10 for generating a signal K to indicate a cold start phase, a signal to indicate the expiration of a predetermined time-span t0 (cf. FIG. 3), and a signal to indicate the time since the beginning of the cold start phase, and a driver 50 for generating signals V1, V2 for adjusting the stroke of the intake valves of the cylinder banks ZB1, ZB2 from "small" to "large" during the engine's cold start phase by way of a respective shift valve SV1, SV2. In addition to the valve stroke adjustment, a catalytic converter heater (not shown) is also operating during this phase.

In the suction line 1 there is an electronically controllable throttle 2 which is connected to a controller 3 that controls the throttle opening angle using the PID method and emits a corresponding control value DS to the throttle 2 and receives a corresponding feedback value RS from the throttle 2, from which the actual value is formed in the controller 3. The figure includes schematic representations, referenced P1-P4, of control parameters which are fed back to the controller 3, such as the degree of gas pedal activation, the engine temperature, r.p.m., engine load, etc., from which the setpoint value is formed in the control 3.

The number 4 references a device for acquiring the effective integral component I(t), i.e., the coefficient of the integral value of the difference between the setpoint value and the effective value (control deviation) for the PID control process of the controller 3. The number 5 references a comparator for comparing the effective integral component I(t) acquired by the detector 4 with corresponding threshold values S1(t), S2(t) that are stored in a storage device 6. In order to ensure the correct allocation of the effective integral component I(t) to a corresponding threshold value S1(t), S2(t) stored in the storage device 6, the comparator 5 receives a signal from the controller 10 indicating that the cold start phase is running and how much time has elapsed since it began.

When the first threshold value S1(t) is exceeded by the effective integral component I(t), this indicates that the function of the valve stroke adjusting device 10, 50, SV1, SV2 is correct (positive comparison result). When I(t) is below the first threshold value S1(t) but above the second threshold value S2(t), this indicates that one of the two cylinder banks ZB1, ZB2 of the internal combustion engine 100 contains a functional error in the valve stroke adjusting device 10, 50, SV1, SV2, e.g., a failure of the respective shift valve SV1 or SV2 (semi-negative comparison result). When I(t) is below the second threshold value S2(t), this indicates a malfunction of the valve stroke adjusting device 10, 50, SV1, SV2 for both cylinder banks ZB1, ZB2 (negative comparison result).

In the event of a semi-negative or negative comparison result, the comparator 5 drives a signaling means 7 to emit a warning signal indicating a malfunction of the valve stroke adjusting device 10, 50, SV1, SV2 and to take further engine management steps as warranted.

Figure 2:
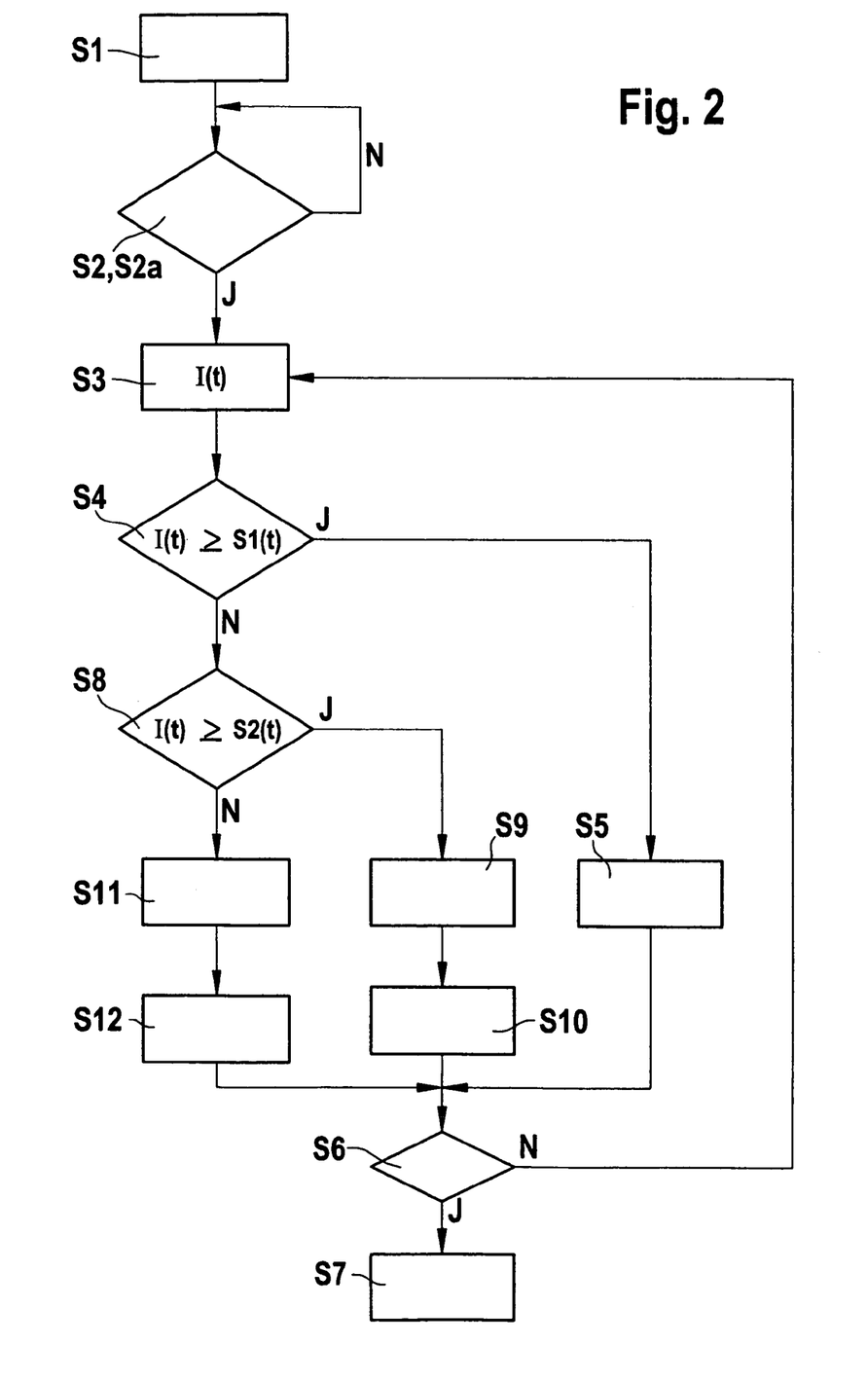
FIG. 2 is a flowchart of a corresponding first embodiment of the inventive method for monitoring the functionality of a valve stroke adjusting device of an internal combustion engine.

FIG. 2 is a flowchart representing a corresponding first embodiment of a method for monitoring the functionality of a valve stroke adjusting device of an internal combustion engine.

In FIG. 2 step S1 refers to the start of the first embodiment of the method for monitoring the functionality of a valve stroke adjusting device 10, 50, SV1, SV2 of an internal combustion engine 100. Step S2 is the determination of whether the internal combustion engine 100 is presently in a cold start phase KSP, and step S2a is the determination of the time-span t already elapsed during the cold start phase KSP and whether this time-span t already equals at least a time-span t0 of several, in this case 8, seconds, after which it is possible to monitor the functionality using the method described here (cf. FIG. 3).

If the internal combustion engine 100 is not in the cold start phase KSP, or the predetermined time-span t0 has not yet elapsed, the method loops back and repeats step S2 until the desired condition exists.

If the internal combustion engine 100 is in the cold start phase KSP, and the predetermined time-span t0 has elapsed, in step S3 the comparator 5 loads an effective integral component I(t) that has been acquired by the detector 4 and an effective time t from the control device 10 and, in step S4, compares the effective integral component I(t) with a corresponding first threshold value S1(t) which it loads from the storage device 6.

If the result of the comparison in step S4 is that the effective integral component I(t) is greater than or equal to the first threshold value S1(t), the process continues at step S5 with the determination that the valve stroke adjusting device 10, 50, SV1, SV2 is functioning correctly. Next, in step S6 it is determined whether the cold start phase KSP is over. If so, the process ends in step 7.

If the cold start phase KSP is not over in step S6, the process loops back to step S3 with the determination of a new integral component I(t), and so on.

If the comparison result in step S4 is negative, i.e., the effective integral component I(t) is less than the corresponding first threshold value S1(t), the program continues with step S8, in which the comparator 5 compares the effective integral component I(t) with the corresponding second threshold value S2(t) from the storage device.

If the comparison in step S8 shows that the effective integral component I(t) is greater than or equal to the corresponding second threshold value S2(t), the program branches to step S9, in which it is determined that one of the two cylinder banks ZB1, ZB2 comprises a malfunction of the valve stroke adjusting device 10, 50, SV1, SV2. In step S10 this malfunction is indicated on the display 7. The program then continues with step S6 etc., as described above.

If the comparison in step S8 shows that the effective integral component I(t) is also less than the corresponding second threshold value S2(t), there follows the determination in step S11 that both of the cylinder banks ZB1, ZB2 of the internal combustion engine 100 comprise a malfunction of the valve stroke adjusting device 10, 50, SV1, SV2. In that case, this malfunction is indicated on the display 7 in step S12, whereupon the program continues with step S6 etc., as described above.

Figure 3:
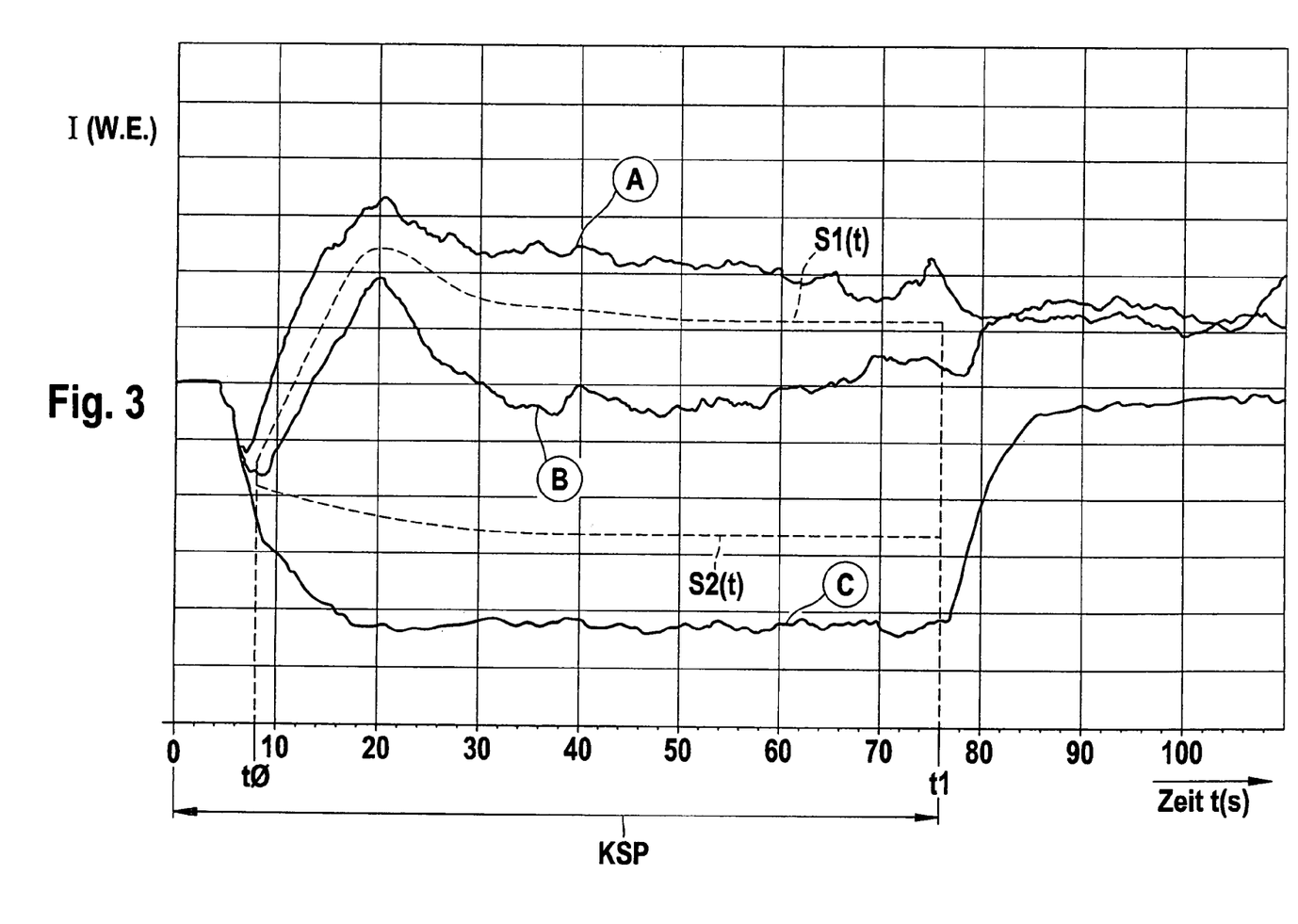
FIG. 3 is a diagram illustrating the time characteristic of the integral I(t) of a throttle control in the cold start phase, where A, B, C are different functionalities of the valve stroke adjusting device, and S1(t), S2(t) are corresponding threshold value curves.

FIG. 3 is a diagram representing the time characteristic of the integral value I(t) of a throttle control in the cold start phase, in which the curves A, B, C represent different states of functionality of the valve stroke adjusting device, and curves S1(t), S2(t) represent correspondingly selected threshold value curves.

FIG. 3 represents time t in seconds along the abscissa. The cold start phase begins at t=0 and lasts until time t1=78 s. During the cold start phase KSP, the logic signal K of the control device 10 is set, which drives the driver 50 to set the valve stroke in the two cylinder banks ZB1, ZB2 to "large." Plotted along the ordinate in FIG. 3 is the curve of the integral component I(t) during the cold start phase KSP in any arbitrary units.

Curve A represents the case in which both cylinder banks ZB1, ZB2 comprise a functional valve stroke adjusting device 10, 50, SV1, SV2; i.e., both are set to "large." Curve B represents the case in which one of the two cylinder banks ZB1, ZB2 has a malfunction of the valve stroke adjusting device 10, 50, SV1, SV2; i.e., the valve stroke in one of the two cylinder banks ZB1, ZB2 has remained "small." Finally, curve C represents the case in which both cylinder banks ZB1, ZB2 contain a malfunction with respect to the valve stroke adjusting device 10, 50, SV1, SV2; i.e., both cylinder banks ZB1, ZB2 remain in the "small" valve stroke.

FIG. 3 plainly shows how the integral component I(t) of the control device 3 of the throttle 2 obviously reflects a malfunction of the valve stroke adjustment. The malfunction can be detected through an appropriate evaluation. To that end, the threshold values S1(t) and S2(t) are placed between curves A and B, and B and C, respectively, as a function of time. As already explained in connection with FIGS. 1 and 2, the criterion for a fully functional valve stroke adjustment is $I(t) \geq S1(t)$, the criterion for a semi-functional valve stroke adjustment is $S1(t) > I(t) \geq S2(t)$, and the criterion for a wholly malfunctioning valve stroke adjustment is $I(t) < S2(t)$.

It also emerges from FIG. 3 that the application of the malfunction detection is possible only after time-span t0, here 8 seconds, following the beginning of the cold start phase KSP. This is based on the transient recovery phase needed for the control device 3, in other words the inertia of the components of the internal combustion engine 100.

The physical cause which causes curves A, B, C to fall apart lies in the different drag torque for the "small" and "large" valve stroke adjustments, as well as the different flow resistance.

Figure 4:
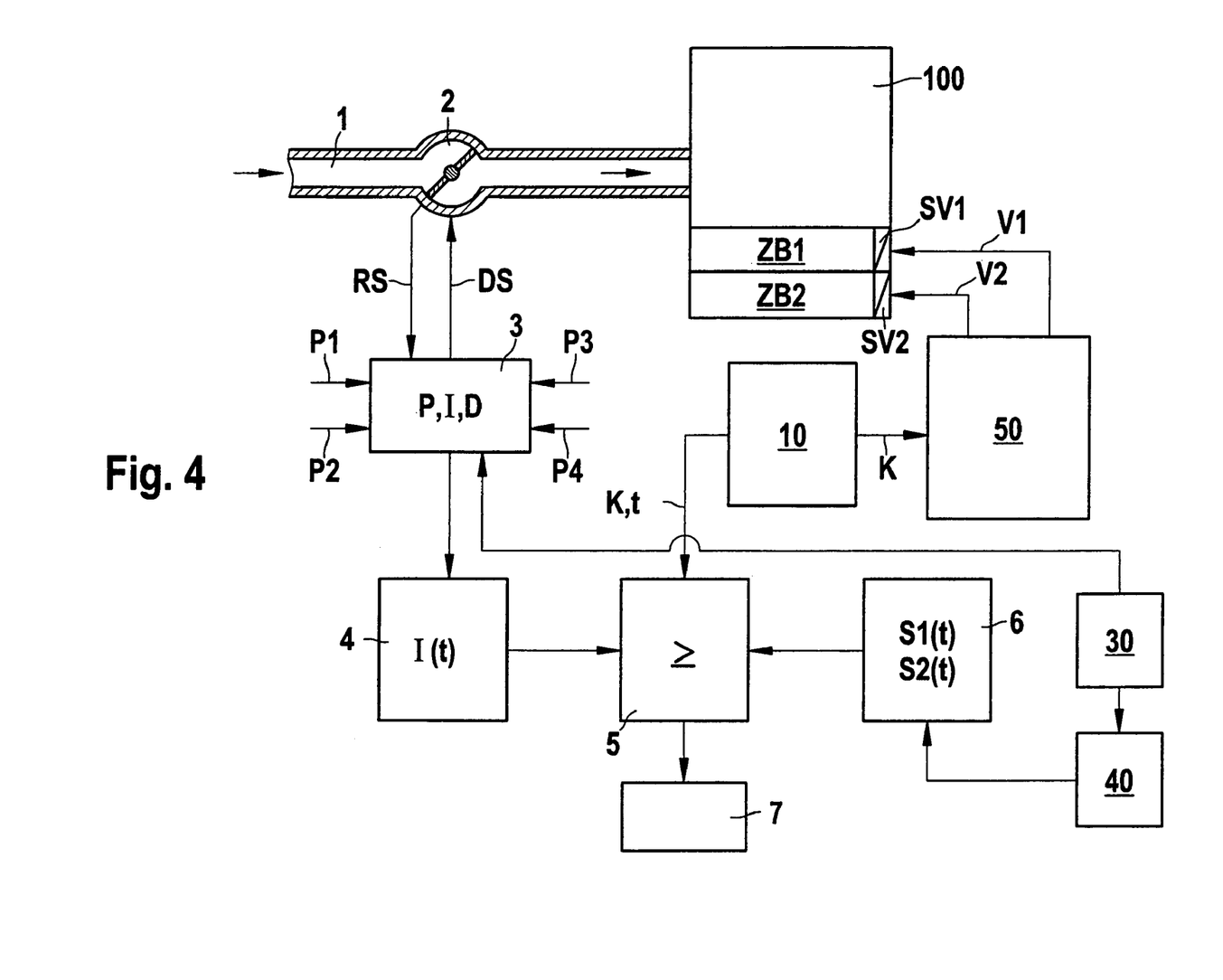
FIG. 4 is a block diagram of a second embodiment of the inventive device for monitoring the functionality of a valve stroke adjusting device of an internal combustion engine.

FIG. 4 is a block diagram showing a second embodiment of the device of the invention for monitoring the functionality of a valve stroke adjusting device of an internal combustion engine.

In the embodiment according to FIG. 4, in addition to the structure according to FIG. 1, a throttle adaptation means 30 is provided, which supplies throttle setpoint adaptation values. These throttle setpoint adaptation values change the throttle opening controlled by the control 3. Such adaptation of the throttle setpoints entails a change in the progression of curves A, B, C according to FIG. 3, although the sensitivity to malfunction, i.e., the breakup in cases A, B, C in the cold start phase KSP, remains. In particular, the adaptation takes into account production tolerances and aging processes of the internal combustion engine 100.

Because of the change in the curves A, B, C as a result of the adaptation, the threshold values S1(t) and S2(t) must also be adjusted accordingly. In this embodiment, this is accomplished by a threshold value adaptation device 40, which is connected to the throttle setpoint adaptation device 30. In the simplest case, threshold adaptation values are added to or subtracted from the threshold values.

Otherwise the structure and function of the second embodiment, represented in FIG. 4, are identical to those of the first embodiment in FIG. 1.

Figure 5:
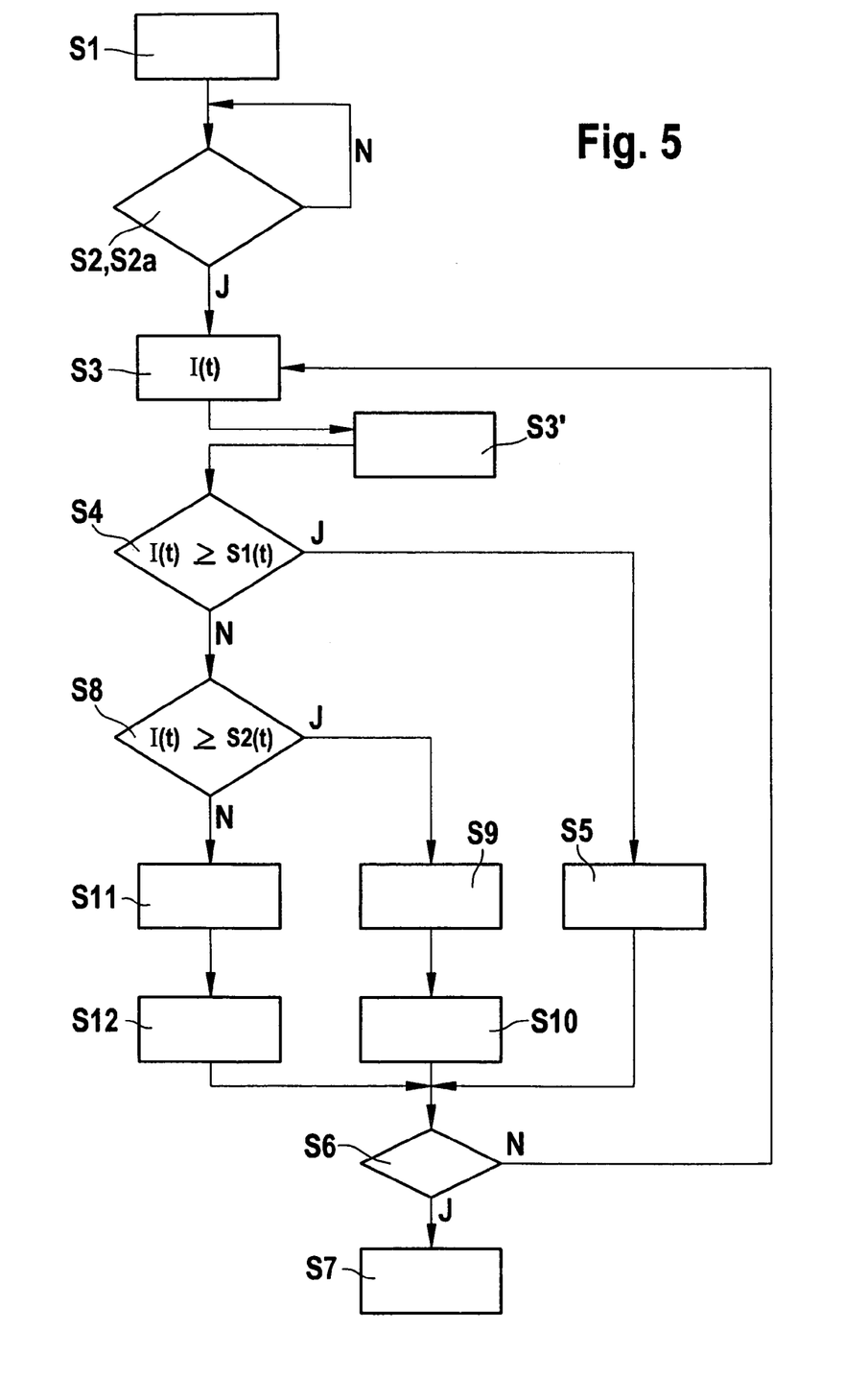
FIG. 5 is a flowchart of a corresponding second embodiment of the inventive method for monitoring the functionality of a valve stroke adjusting device of an internal combustion engine.

FIG. 5 is a flowchart representing a corresponding embodiment of the method of the invention for monitoring the functionality of a valve stroke adjusting device of an internal combustion engine.

In addition to the steps already laid out in connection with FIG. 2, a step S3' occurs between steps S3 and S4, which ensures that, prior to the comparison according to step S4, or respectively S8, the threshold values S1(t) and S2(t) are adapted according to the adaptation status of the throttle setpoint adaptation device 30. Otherwise this method proceeds exactly like the method already described in connection with FIG. 2.

Although the present invention was described with reference to the above exemplifying embodiments, it is not limited to these and may be modified manifold ways.

Although the threshold values S1 and S2 in the above described embodiments were assumed to be time-dependent, in a simplified monitoring system, they may also be constant. This would change the dead time from approx. 8 s. to approx. 20 s. in the system according to FIG. 3.

Furthermore, the control process need not necessarily be a PID process; rather, it may also be some other control technique with an I-component.

The foregoing disclosures has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for monitoring a functionality of a valve stroke adjusting device of an internal combustion engine in a cold start phase, the internal combustion engine including a throttle that is electronically controllable by a control, wherein the control utilizes an integral component to control the throttle, comprising the steps of:

determining the existence of a cold start phase;

acquiring the integral component in the cold start phase;

comparing the acquired integral component in the cold start phase with at least one predetermined threshold value; and evaluating the functionality of the valve stroke adjusting device based on the result of the comparison in the comparing step.

2. The method according to claim 1, further comprising the steps of:

determining a time-span elapsed since the beginning of the cold start phase; and determining whether the determined elapsed time-span is at least equal to a predetermined time-span, wherein the integral component acquiring step is performed only if the determined elapsed time-span is at least equal to said predetermined time-span.

3. The method according to claim 2, wherein the threshold value in the comparing step is selected from a plurality of predetermined threshold values as a function of the determined elapsed time-span.

4. The method according claim 1, wherein the internal combustion engine includes two cylinder banks with separate valve stroke adjustment by the valve stroke adjusting device, wherein the comparing step and the evaluating step include:

a first comparison of the integral component acquired in the cold start phase with a predetermined first threshold value;

a first evaluation of the functionality of the valve stroke adjusting device of the two cylinder banks based on the result of the first comparison;

a second comparison of the integral component acquired in the cold start phase with a predetermined second threshold value if the first evaluation results in a determination that the functionality of the valve stroke adjusting device of at least one of the two cylinder banks is faulty; and a second evaluation of the functionality of the valve stroke adjusting device of the two cylinder banks based on the result of the second comparison.

5. The method according to claim 4, wherein at least one threshold value is stored in a storage device.

6. The method according to claim 4, wherein at least one threshold value is set as a function of a throttle setpoint adaptation.

7. The method according to claim 1, wherein evaluated faults in the functioning of the valve stroke adjusting device are indicated via a display.

8. A device for monitoring a functionality of a valve stroke adjusting device of an internal combustion engine in a cold start phase, the internal combustion engine including a throttle that is electronically controllable by a control, the control programmed to use an integral component to control the throttle, comprising:

a detector for acquiring the integral component in the cold start phase; and a comparator for comparing the integral component with at least one predetermined threshold value stored in a storage device and evaluating the functionality of the valve stroke adjusting device based on a result of the comparison.

9. The device according to claim 8, wherein the valve stroke adjusting device includes a control for generating a control signal for indicating the cold start phase, and said comparator is configured to perform the comparison only after receipt of the control signal.

10. The device according to claim 9, wherein the control is configured to generate a time-span signal when a predetermined time-span has elapsed since the beginning of the cold start phase, and the comparator is configured to perform the comparison only after receipt of the time-span signal.

11. The device according to claim 8, wherein the control is configured to generate a time-span signal which indicates a time-span that has elapsed since the beginning of the cold start phase (KSP), a plurality of predetermined threshold values corresponding to a plurality of times elapsed since the beginning of the cold start phase are stored in the storage device, and the comparator is configured to select the at least one predetermined threshold value to compare with the acquired integral component based on the elapsed time-span.

12. The device according to claim 8, wherein the internal combustion engine includes two cylinder banks with separate valve stroke adjustment by the valve stroke adjusting device, and the comparator is configured to perform a first comparison of the integral component acquired in the cold start phase with a predetermined first threshold value;

a first evaluation of the functionality of the valve stroke adjusting device of the two cylinder banks based on the result of the first comparison;

a second comparison of the integral component acquired in the cold start phase with a predetermined second threshold value if the first evaluation results in a determination that the functionality of the valve stroke adjusting device of at least one of the two cylinder banks is faulty; and a second evaluation of the functionality of the valve stroke adjusting device of the two cylinder banks based on the result of the second comparison.

13. A device according to claim 12, further comprising:

a throttle adaptation device configured to adapt the throttle setpoint; and a threshold value adaptation device configured to adapt at least one predetermined threshold value.

14. The device according to claim 13, further comprising:

a display, said display displaying evaluated faults in the functioning of the valve stroke adjusting device.

* * * * *